UNITED STATES PATENT OFFICE.

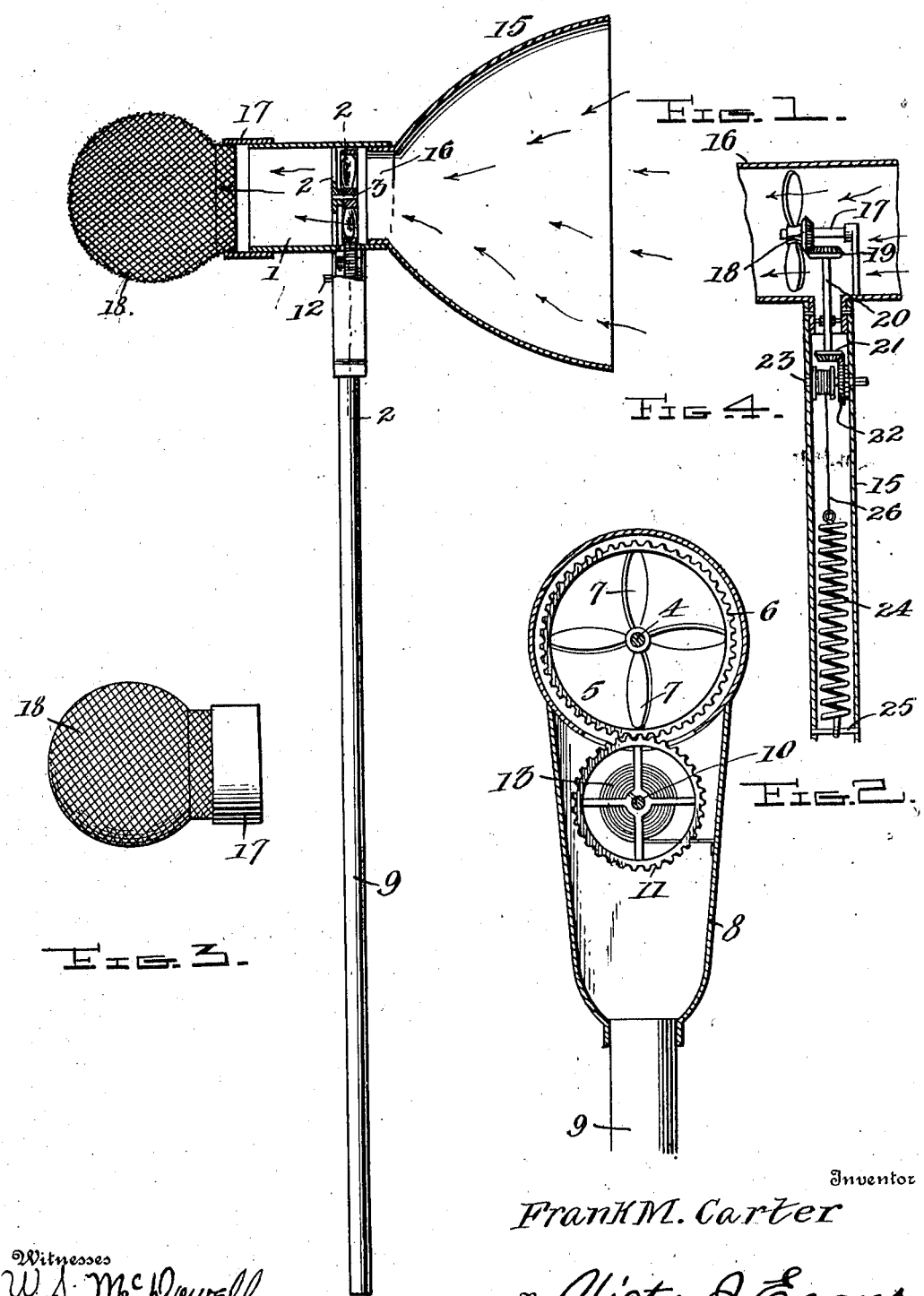

FRANK M. CARTER, OF STONINGTON, MAINE.

INSECT-CATCHER.

970,181. Specification of Letters Patent. Patented Sept. 13, 1910.

Application filed June 5, 1909. Serial No. 500,286.

*To all whom it may concern:*

Be it known that I, FRANK M. CARTER, a citizen of the United States, residing at Stonington, in the county of Hancock and State of Maine, have invented new and useful Improvements in Insect - Catchers, of which the following is a specification.

This invention relates to insect catchers, and has for an object to provide a device particularly adapted for use in catching flies or similar insects and consists broadly of a suction apparatus for creating an air draft at the inlet end of the apparatus so that when the insects are within a certain radius of the inlet end they will be drawn by suction into the apparatus and deposited into a receptacle.

A still further object of my invention is to provide a receptacle of such construction that will be disposed immediately in line of travel of the insects and which will be thus arranged to act as an abutment or obstruction against which the insects may be thrown and instantly killed.

Other objects and advantages will be apparent as the nature of the invention is better set forth, and it will be understood that changes within the scope of the claims may be resorted to without departing from the spirit of the invention.

In the drawing, forming a portion of this specification and in which like numerals of reference indicate similar parts in the several views:—Figure 1 is a detail longitudinal section through the insect catcher, the handle being shown in elevation. Fig. 2 is a detail section taken on the line 2—2 of Fig. 1. Fig. 3 is a detail elevation of the receptacle. Fig. 4 is a detail vertical section through a slightly modified form of my invention.

Referring now more particularly to the drawing, there is shown an insect catcher consisting broadly of a horizontally disposed sleeve 1 adapted to form what will be hereinafter termed a chamber, and as shown the sleeve is provided therewithin with a spider 2 which carries a horizontally disposed stub shaft 3 upon which is mounted the hub 4 of a fan 5 provided with an annular series of gear teeth 6 and with a series of radial wings 7 which are suitably spaced from each other as clearly shown in Fig. 2 of the drawing. The construction of the fan 5 is such that it broadly consists of a gear in which the spokes are constructed in the form of blades or vanes, and for the sake of clearness the said fan will be described hereinafter as a gear. The casing 8 is secured in any suitable manner to the sleeve 1 and depends therefrom and is preferably provided with a detachable handle 9. The casing 8 is provided with a horizontally disposed spring driven shaft 10 upon which is mounted a gear wheel 11 that meshes with the annular series of teeth 6 upon the fan 5. The shaft 10 is provided with a squared outer end 12 with which may be engaged any desired form of winding key. A spring 13 has one end fixed to the shaft 10 and the other end of the said spring is fixed in any suitable manner to the casing 8.

It will of course be understood that any suitable well known motor can be provided for revolving the fan and I do not desire to limit myself to the one herein shown.

An element or bell shaped member 15 is carried by the apparatus and has at its reduced end an annular collar 16 frictionally engaged with the walls of the sleeve 1. At the opposite end the sleeve 1 has removably engaged therewith a collar 17 to which is connected in any suitable manner a receptacle 18 which is preferably formed from suitable wire gauze or any other foraminous material. The bell shaped member 15 is of such form that its intake end is located immediately in line with the chamber formed by the sleeve 1 and also in line with the receptacle 18.

In operation, the shaft 10 is actuated so as to wind the spring 13 and in this way drives the gear 11, which in view of the fact that it meshes with the teeth 6 of the fan will revolve the latter so that the wings 7 will operate to create a draft or suction within the bell shaped member 15. The handle 9 may be held in the hand of the operator of the device or it may be stationed or fixed at any desired point. It will be seen that when insects are traveling at points adjacent to the inlet end of the member 15 the suction created by the fan will be sufficient to draw the insects inwardly and to finally deposit them into the receptacle 18. The air draft will of course be of such force that even if the insects are not killed incident to their contacting with the fan blades they will be thrown with such force against the walls of the receptacle 18 that they will be instantly killed. The receptacle 18 as hereinbefore stated is removable so that the insects therein after an operation of the device may be conveniently removed and if necessary the receptacle can be sterilized or otherwise cleaned.

In the form of my invention shown in Fig. 4 a casing 15' is provided and has secured thereto at its upper end a sleeve 16 in which is mounted a wing carried shaft 17. A bevel gear 18 is mounted upon the shaft 17 and meshes with a similar gear 19 upon one end of a shaft 20. The other end of the shaft 20 carries a bevel gear 21 which meshes with a similar gear 22 carried by a drive shaft 23. A retractile spring 24 is mounted in the casing 15' and has one end secured thereto as shown at 25. The other end of the spring is secured to one end of a flexible connection 26 and is wound about a drum or spool 27 upon the drive shaft 23. The shaft 23 is similar in construction to the shaft 12 described in the preferred form of my invention and is adapted to be actuated by any suitable well known form of key so that the flexible connection 26 can be wound upon the spool or drum as above stated and to pull sufficient tension against the spring 24 so that the hereinbefore mentioned geared shafts can be operatively revolved.

The bell shaped member 15 described in the preferred form of my invention may be nickel plated or silvered upon its inner face so as to effectively serve the purpose as a reflector and to attract insects into the sleeve 1 as is obvious.

If desired any well known form of illuminating means may be attached to the bell 15 to serve as a bait.

I claim:—

1. A device of the class described comprising a sleeve, a revolving fan located in the sleeve, a bell-shaped member at one end of the sleeve, a removable receptacle of foraminous material engaged with the other end of the sleeve and disposed directly in line with the said bell-shaped member, said fan having a toothed peripheral rim, and a motor geared to the toothed peripheral rim for driving the fan.

2. A device of the class described comprising a sleeve, a fan located in the sleeve, a casing connected with the sleeve and opening thereinto, a bell-shaped member at one end of the sleeve, a receptacle of foraminous material at the other end of the sleeve, a handle secured to the casing, and a driving motor located in the casing and geared to the fan for driving the same.

In testimony whereof I affix my signature in presence of two witnesses.

FRANK M. CARTER.

Witnesses:
ERASTUS J. CARTER,
E. S. CARTER.